(12) United States Patent
Marggraff et al.

(10) Patent No.: US 8,446,297 B2
(45) Date of Patent: May 21, 2013

(54) GROUPING VARIABLE MEDIA INPUTS TO REFLECT A USER SESSION

(75) Inventors: Jim Marggraff, Lafayette, CA (US); Erica Leverett, Berkeley, CA (US); Tracy L. Edgecomb, Berkeley, CA (US); Alexander Sasha Pesic, San Ramon, CA (US)

(73) Assignee: LiveScribe, Inc., Oakland, CA (US)

( * ) Notice: Subject to any disclaimer, the term of this patent is extended or adjusted under 35 U.S.C. 154(b) by 1086 days.

(21) Appl. No.: 12/415,347

(22) Filed: Mar. 31, 2009

(65) Prior Publication Data

US 2009/0251337 A1    Oct. 8, 2009

Related U.S. Application Data

(60) Provisional application No. 61/042,222, filed on Apr. 3, 2008.

(51) Int. Cl.
*H03K 17/94* (2006.01)
(52) U.S. Cl.
USPC ............................................. 341/20; 345/177
(58) Field of Classification Search
USPC ................. 382/313; 341/20; 345/177, 179
See application file for complete search history.

(56) References Cited

U.S. PATENT DOCUMENTS

| | | | |
|---|---|---|---|
| 7,175,095 B2 | 2/2007 | Pettersson et al. | |
| 7,281,664 B1 | 10/2007 | Thaeler et al. | |
| 2003/0234772 A1* | 12/2003 | Zhang et al. | 345/177 |
| 2004/0229195 A1 | 11/2004 | Marggraff et al. | |
| 2006/0029296 A1* | 2/2006 | King et al. | 382/313 |
| 2006/0033725 A1 | 2/2006 | Marggraff et al. | |
| 2006/0066591 A1 | 3/2006 | Marggraff et al. | |
| 2006/0067576 A1 | 3/2006 | Marggraff et al. | |
| 2006/0067577 A1 | 3/2006 | Marggraff et al. | |
| 2006/0077184 A1 | 4/2006 | Marggraff et al. | |
| 2006/0078866 A1 | 4/2006 | Marggraff et al. | |
| 2006/0080608 A1 | 4/2006 | Marggraff et al. | |
| 2006/0080609 A1 | 4/2006 | Marggraff et al. | |
| 2006/0125805 A1 | 6/2006 | Marggraff et al. | |
| 2006/0127872 A1 | 6/2006 | Marggraff et al. | |
| 2006/0292543 A1 | 12/2006 | Marggraff et al. | |
| 2007/0097100 A1 | 5/2007 | Marggraff et al. | |
| 2007/0222770 A1* | 9/2007 | Silverbrook et al. | 345/179 |
| 2007/0280627 A1 | 12/2007 | Marggraff et al. | |

FOREIGN PATENT DOCUMENTS

WO    WO 2007/141204 A1    12/2007

OTHER PUBLICATIONS

PCT International Search Report and Written Opinion, PCT Application No. PCT/US2009/039339, May 15, 2009, 7 pages.

* cited by examiner

*Primary Examiner* — Hai Phan
*Assistant Examiner* — Kaleria Knox
(74) *Attorney, Agent, or Firm* — Fenwick & West LLP

(57) ABSTRACT

Embodiments of the invention present a system and method for identifying relationships between different types of data captured by a pen-based computing system, such as a smart pen. The pen-based computing system generates one or more sessions including different types of data that are associated with each other. In one embodiment, the pen-based computing system generates an index file including captured audio data and written data, where the written data is associated with a temporal location of the audio data corresponding to the time the written data was captured. For example, the pen-based computing system applies one or more heuristic processes to the received data to identify relationships between various types of the received data, used to associated different types of data with each other.

21 Claims, 3 Drawing Sheets

GROUPING VARIABLE MEDIA INPUTS TO REFLECT A USER SESSION

CROSS REFERENCE TO RELATED APPLICATIONS

This application claims the benefit of U.S. Provisional Application No. 61/042,222, filed Apr. 3, 2008, which is incorporated by reference in its entirety.

BACKGROUND

This invention relates generally to pen-based computing systems, and more particularly to grouping different types of data captured by a pen-based computing system.

A real-life experience is made up of multiple observations and impressions that are organized into a cohesive event by the mind of the observer. Often, the unifying element or elements of the multiple observations and impressions of a real-life experience are not immediately obvious. Further, although referencing the same event, various observations and impressions can occur at different times or in different locations.

Similarly, various, even seemingly disparate, pieces of data, such as audio data, video data, image data and text data, can be collected and subsequently organized, stored or manipulated to adhere to a single unifying theme; various real-world experiences, such as a meeting, a lecture class and a laboratory experiment, can logically be connected and collectively viewed as a "session." Various types of data that are related to each other are captured during a session. For example, during a lecture, an audio file of the lecture and written data including lecture notes are captured.

However, without a method to determine a relationship between various data types captured during a session, the captured data cannot be linked together in a meaningful way. Hence the captured data is merely disparate pieces of information. Accordingly, there is a need for a system and method for identifying an association between various data having different types.

SUMMARY

Embodiments of the invention present a system and method for identifying relationships between different types of data. One or more types of data are captured by a pen-based computing system, such as a smart pen or other device, and communicated from the pen-based computing system to a computer. The pen-based computing system analyzes different combinations of the types of the received data to generate one or more sessions including different types of data associated with each other. In one embodiment, the pen-based computing system generates an index file including captured audio data and captured written data, where the captured written data is associated with a temporal location of the audio data when the written data was captured. Alternatively, the pen-based computing system generates an index file including written data captured from multiple sources or captured at different times. For example, the pen-based computing system identifies relationships between various types of the received data by applying one or more heuristic processes to the received data to associate different types of data with each other. The various types of data included in the generated session are displayed to a user for review and modification.

In one embodiment, the applied one or more heuristic processes use one or more parameters describing an association between different types of data to generate a session. Example parameters for generating a session include: placement of audio within audio or video files, placement of video within video files, timing, location and frequency of written, auditory or visual data, pitch change in audio files, identification of speaker associated with audio, data describing user interaction (e.g., timestamp corresponding to editing or creation of a file, characteristics associated with text data editing), metadata associated with files (e.g., time of day, session name, user-defined tags or labels), data from a linked scheduling application, references between files, linking of different text data to specific audio or video data, linking of different audio or video data to specific text data, linking between audio or video data and a specific source of written data and/or location of written data on a page, user-defined or automatically assigned tags associated with written or audio data.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
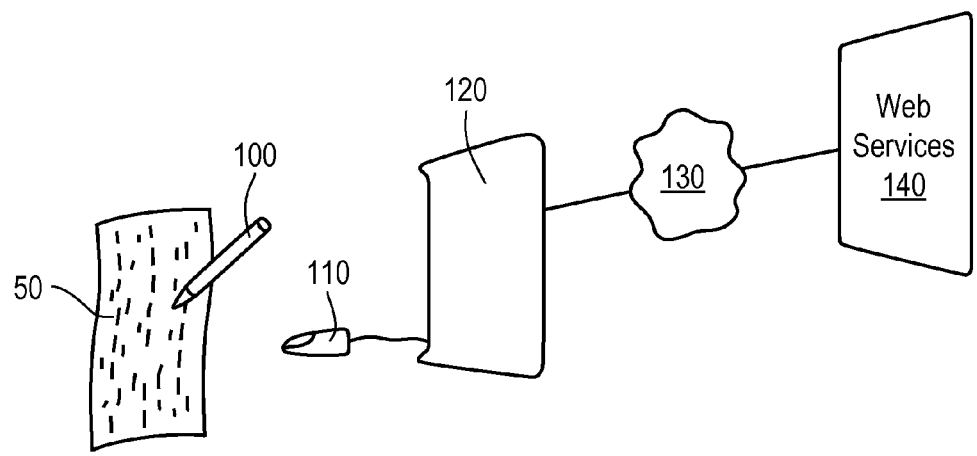
FIG. 1 is a schematic diagram of a pen-based computing system, in accordance with an embodiment of the invention.

Embodiments of the invention may be implemented on various embodiments of a pen-based computing system, an example of which is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains, including electronic paper.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information, playing audio or responding in context to physical interaction such as tapping, tracing, or selecting other pre-existing visual information. In other embodiments, the smart pen 100 includes additional input modalities, such as motion sensing or gesture capture, and/or additional output modalities, such as vibrational feedback. By receiving different types of input, the smart pen 100 may simultaneously capture different types of data, such as audio, movement and/or written or text, which can be used to generate a session including different types of data.

Figure 2:
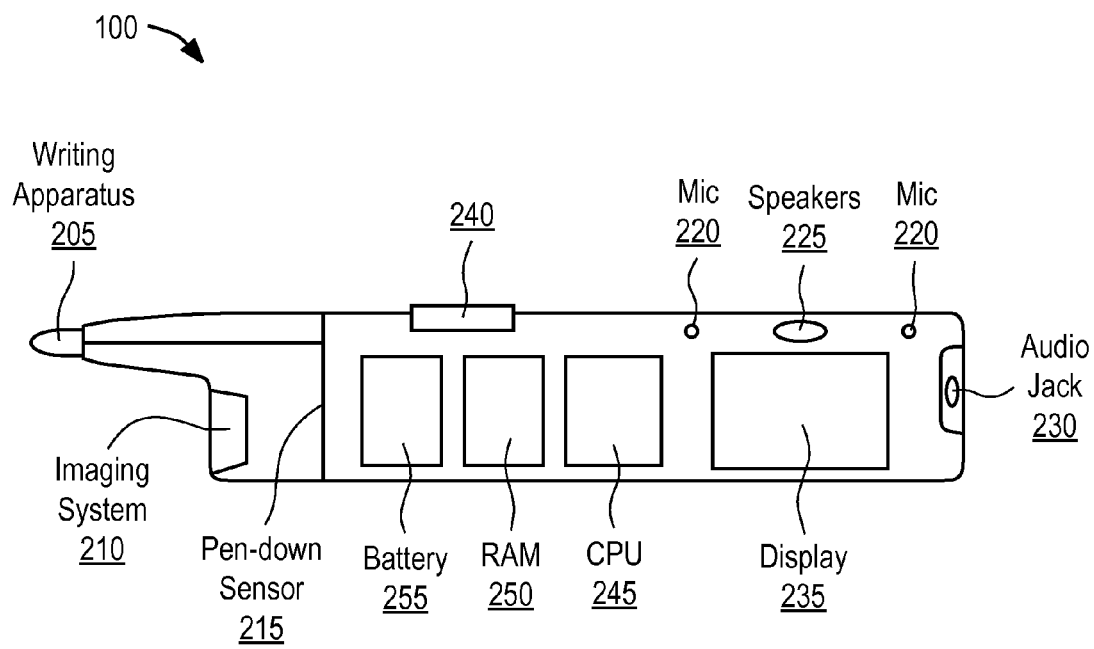
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system. For example a variety of types of switches including buttons, rocker panels, capacitive sensors, heat sensors, pressure sensors, biometric sensors or other sensing devices could be added.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50, entirely by the smart pen 100, or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sense movement of the smart pen 100 tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications, such as Bluetooth, WiFi, RF, infrared and ultrasonic sound. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also employ buttons, such as a power button or an audio recording button and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and/or gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use other appropriate means for achieving the same function. In an embodiment, data captured by the imaging system 210 is subsequently processed, allowing one or more content recognition algorithms, such as character recognition, to be applied to the received data.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until off-loaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100.

In an embodiment, the operating system and applications support a sequence of independent and/or concurrent input and output modalities and seamless transitions between these modalities to provide for language learning. For example, a language learning (LL) application running on an operating system supporting modality independence, concurrence and sequencing might begin a lesson announcing that today is a lesson in writing, reading, speaking and listening to Chinese. The smart pen 100 might then animate the creation of a Mandarin character, drawing strokes of the character in proper order on the display 235, while simultaneously announcing the character's pronunciation via the speaker 225. The operating system would enable the simultaneous display and synchronized delivery of audio. The LL application might then prompt the user to draw each stroke of the character, following the animated display of each stroke on the display 225, thus sequencing the transition between modalities of visual output of information displayed on the smart pen 100, in a synchronized manner, with the input of stroke data by a user. As the user becomes more fluent with the creations of the character, and begins writing more rapidly, perhaps writing ahead of the strokes displayed, the OS will enable real time capture and interpretation of strokes and respond with proper displaying and audio as appropriate, engaging the user in a multimodal dialogue. As the user demonstrates proficiency in writing, and the smart pen 100 begins to be lead by the user, displaying strokes in response, rather than leading with strokes, the smart pen 100 might verbally compliment the user and request the user to speak the sound for the character during or after the stroke writing. As the user speaks the character sound, the smart pen 100 could record the sound and compare it to an exemplar. The smart pen 100 might then prompt the user by playing back the exemplar pronunciation and the user pronunciation, providing commentary and/or visual guidance regarding correctness in pronunciation The smart pen 100 might then prompt the user to listen, write, and speak, announcing a series of words one by one, waiting for the user to write and speak the words, while comparing the input speech and writing to exemplars, and redirecting the user to repeat writing or speaking as necessary.

In an extension of this example, the smart pen 100 might prompt the user to interact with a pre-printed Language Learning text or workbook. The smart pen 100 might move the user's attention among multiple displays, from text, to the workbook, to a user's notebook, while continuing a dialogue involving the smart pen 100 speaking and displaying independently or concurrently, directing the user to speak, write, and look at information independently or concurrently. Various other combinations of input modalities and output modalities, and sequencing, are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword or a physical motion, may indicate that subsequent input is associated with one or more application commands. Input with a spatial and/or temporal component may also be used to indicate that subsequent data. Examples of input with a spatial input include two dots side-by-side. Examples of input with a temporal component include two dots written one immediately after the other. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Example System Operation

Figure 3:
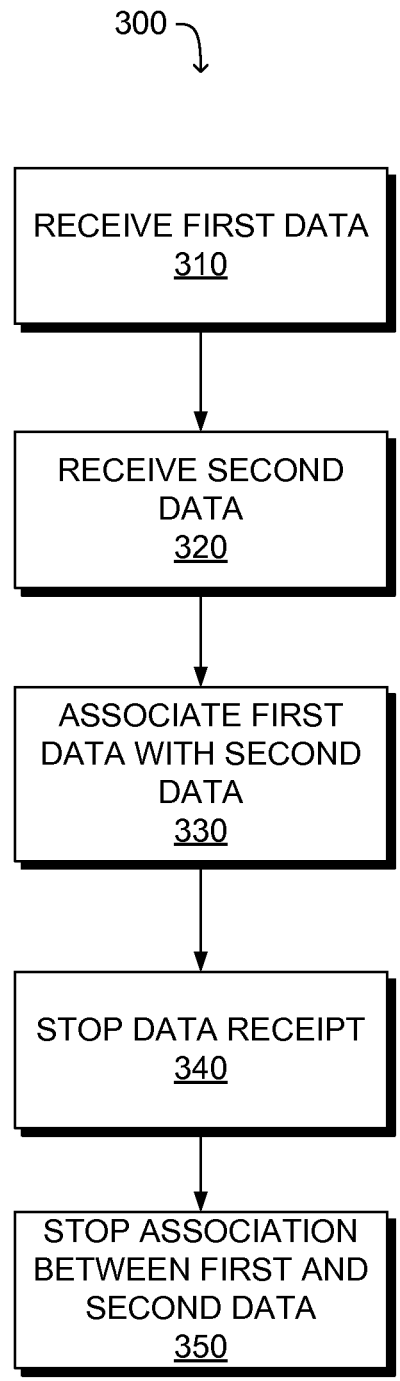
FIG. 3 is a flow chart of generating a session using a smart pen in accordance with an embodiment of the invention.

FIG. 3 shows a flow chart of a method 300 for generating a session using a smart pen 100 in accordance with an embodiment of the invention. Those of skill in the art will recognize that other embodiments can perform the steps of FIG. 3 in different orders. Moreover, other embodiments can include different and/or additional steps than the ones described here. In an embodiment, steps depicted in the method 300 shown in FIG. 3 are implemented by instructions for performing the described actions are embodied or stored within a computer readable medium, e.g., onboard memory 250, that are executable by a processor 245. Those of skill in the art will recognize that the steps of the method 300 may be implemented in embodiments of hardware and/or software or combinations thereof. Moreover, other embodiments can include different and/or additional steps than the ones shown in FIG. 3.

Session generation begins when the smart pen 100 begins receiving 310 a first data. For example, the first data comprises audio data captured by the microphones 220. Alternatively, the first data comprises written data captured from a writing surface 50 using the imaging system 210. The smart pen 100 also receives 320 second data, such as additional notes or other written marks or gesture data describing one or more movements of the smart pen 100. For example, the smart pen 100 captures written data using the imaging system 210 while the microphones 220 are recording audio data. As another example, the smart pen initially captures written data from a first writing surface 50, such as a notebook, and later captures additional written data from a different writing surface, such as a book or other printed document. The smart pen 100 associates 330 the received first data with the received second data to generate a relationship between the different types of data. In an embodiment, the smart pen 100 also associates metadata with the first data and the second data, such as metadata identifying the time and location of each written mark or associates the first and second data with additional data. For example, the smart pen 100 indexes written data to the current position in the captured audio recording to associate 330 the first data with the second data. As another example, the smart pen 100 associates written data captured from a book with additional written data captured from a separate notebook or from a different book.

In an embodiment, the smart pen 100 does not capture either the first or second data itself, but receives 310 previously stored data from another device, such as the computing device 120, a flash drive or other device. For example, the smart pen receives 310 a previously recorded audio stream from an input device, such as the computing device 120, a flash drive or other device receiving one or more types of storage media and associates 330 captured written data or notes with the received audio stream. Similarly, the smart pen received 310 previously captured written data from the computing device 120 or other input device and associates 330 newly received 320 written data with the previously received 310 written data.

In one embodiment, a session ends when the smart pen 100 stops 340 receipt of either the first data or the second data. For example, when the smart pen 100 stops 340 receipt of audio data, such as receiving an input to stop 340 the audio recording, the smart pen also stops 350 associating the second data, such as notes or written data with the audio data to generate a session. However, in other embodiments, sessions may be ended in different ways.

However, the smart pen 100 allows a user to pause audio recording and, while the recording is paused, notes or written marks on the coded paper are still indexed to, or associated 330 with, the audio recording. In one embodiment, notes or marks made while the audio recording is paused are indexed to the position where the audio recording was paused. For example, if a user pauses audio recording 12 minutes after the start of recording while continuing to write notes, the notes written while recording was paused are indexed to 12 minutes after the start of recording, so that written information captured after pausing the audio is indexed to the temporal position in the audio where recording was paused. Once recording is restarted, subsequently captured notes or written data are associated 330 with, or indexed to, the temporal position in the recorded audio where the notes or written data were captured.

Additionally, the smart pen 100 includes a control mechanism allowing the smart pen 100 to continue recording audio for inclusion in a session while simultaneously using a different smart pen 100 function of the smart pen or to take notes that are not to be included in a session. For example, responsive to a first user input, the smart pen 100 enters a "non-indexed" mode where notes or written marks made with the smart pen are not indexed with recorded audio or where a different feature of the smart pen is activated. This prevents the session from including written data, or other non-audio data, that is unrelated to the recorded audio data without disrupting the audio recording. In an embodiment, after receiving a second user input, the smart pen 100 once again indexes written notes or marks to the recorded audio. Alternatively, the smart pen 100 applies one or more rules to the captured written data to determine whether to associate 330 the written data with recorded audio. For example, the smart pen 100 uses the timing, location and frequency of written data to determine whether the written data is associated 330 with the recorded audio data.

In addition to associating audio data with captured written data, as described above, in other embodiments, a session may associate written data captured at different times or captured from different locations with each other. For example, a session may comprise written data captured from pages in a notebook, allowing consecutive pages of written data to be associated with each other, simplifying later access to the written data. As another example, a session may associate written data captured during a specific time interval with each other, even if the written data is captured from different writing sources during the specific time interval. User-input received by the smart pen 100 or the computing system 120 may also be used to generate a session, allowing the user to specify different data that is associated with each other to generate a session; for example, the computing system 120 receives input from a user specifying that notes captured during user-defined time intervals are associated with each other. Additionally, a session may be generated based on external information sources, allowing the external information source to identify the different data that is associated with each other; for example, a scheduling program included on the computing system 120 specifies events and times associated with the events, allowing data captured by the smart pen 100 to be associated with each other even if the smart pen 100 captured different types of data or captured data from different sources during a time associated with an event.

After initial creation of a session including, for example, audio and text data, additional data can be added to the created session. For example, a user can access a session from the smart pen 100, computing system 120 or other device and append additionally recorded audio data or captured written content to the end of the session or insert additional written content into a specified point in the recorded audio. Alternatively, a user can import previously stored audio into the session and insert the audio into a specified point in the session audio or append the received audio to the end of the session. As another example, written notes captured by the imaging system 210 while stored audio data is being replayed may be associated with the stored audio data, and the temporal location within the stored audio corresponding to the time when written data was captured is associated with the written data. This allows additional written data to be associated with temporal locations in audio data even after the audio data has been stored.

To associate captured written data with recorded audio from a session, the smart pen 100 generates an index file associating written data with a temporal position of the recorded audio. For example, the index file comprises entries including a reference to a session, such as a session identifier, and a definition of a portion of the written data and a temporal position of the recorded audio with the session. This allows the index file to identify one or more sessions and specify portions of the written data and portions of the audio data that are associated with various sessions allowing captured written data to be associated with a portion of the captured audio data. Using an index file to associate 330 written content with captured audio increases the flexibility and scope of a session. In an embodiment, the index file also includes metadata related to one or more sessions, such as a session name, one or more identification tags for parts of the session, one or more comments or other data associated with a session.

For example, the index file allows any number of notes, or other written data, to be associated with the same temporal position of the recorded audio and allows written content, such as notes, to be spread across multiple pages or different paper sources. In an embodiment, the index file can be modified by a user via the computing system 120, allowing the user to generate a customized index file where text data, or other written content, is associated with audio data captured at different times. For example, a user can create an index file having a text description for multiple concepts. Each text description is associated with audio related to the identified concept, regardless of when the audio was captured. This allows the user to access audio captured at different times, but associated with the same concept, using the index file.

After the smart pen 100 generates a session, the session can be communicated to the computing system 120 via docking station or through a wireless communication channel, allowing a user to access and/or modify the session from the computing system 120. In one embodiment, the computing system 120 stores sessions according to the date and time of creation. When a user accesses a stored session from the computer, the user is able to play audio from the session, rename the session, delete the session, share the session with other users, upload the session to a remote device, view written data associated with the session or otherwise access or modify the session (e.g., associate additional content such as other sessions, web pages, previously stored data, images or other data with the session). For example, a user can identify one or more components of a session that are shared to other users or identify one or more components of a session that are not shared with other users. For example, a session includes lecture notes, items from a shopping list and a calendar appointment. After identifying the session, the user may select the lecture notes as shared with other users and/or may select the shopping list and calendar appointment as not shared with other users.

In addition to allowing selective sharing of portions of a session with additional users, a session also allows data from multiple sources to be aggregated, simplifying later access to the data. For example, a session includes notes about a particular topic captured from multiple written surfaces, such as multiple notebooks, printed documents and books. As the session includes the related notes in a single location, accessing the session allows retrieval of data from multiple sources. In this example, all the notes included in a session may be printed together, even though the notes were captured from different writing surfaces. This ability to aggregate related data into a centralized location allows a session to simplify data retrieval.

Further, the computing system 120 may present a session to a user so that content associated with a single session are readily identified and easily accessed. In an embodiment, when a session is accessed from the computing system 120, content associated with the session is presented so that the association between content is apparent. For example, audio recordings, written data captured from one or more writing surfaces by the smart pen 100 and other related materials such as digital documents or images are each displayed when a session is accessed. For example, when accessing a session if a user accesses a representation of written data that was captured while audio data was being captured, a session identifier is displayed as well as images of other pages of captured data or stored data included in the session as well as pointers or links to additional audio data included in the session. This allows the user to readily identify all the information included in a session.

Additionally, a user can search both audio and written content of a particular session. Users can search one or more sessions for a variety of different media and queries, such as words or images written with the smart pen, audio (using voice or word recognition), metadata (e.g., creation date, tags or other data), paper sources, a range of page numbers or other suitable data.

In different embodiments, the results of searching a session are displayed in different formats. For example, a user can search multiple sessions for written data including a specified word or phrase and obtain as search results all written content from a session including the specified word or phrase. For example, a user search for notes including the name "Sarah" would return all notes from one or more sessions including the name "Sarah," not merely a section of the notes including the name "Sarah."

Additionally, searching sessions as a whole, rather than individual pages, increases the effectiveness of a search. For example, if a user searches for "Strategy Committee budget," a search which merely examines individual pages of written notes would not return a result unless each word in "Strategy Committee budget," appeared on a single page. However, as users often write certain information, such as a title, an organization identifier or a date on the first page of notes but not on subsequent pages, an individual-page-based search of notes would not identify notes where "Strategy Committee" appeared on the first page of the notes and "budget" did not appear until the third page of notes. However, searching notes by session, rather than individual pages, allows identification and retrieval of notes where "Strategy Committee" and "budget" appeared in the notes, even if the terms appeared on different pages of the notes.

Associating metadata with content within a session may further increase the effectiveness of searching sessions as a whole. For example, metadata is associated with content within a session to identify a date and time when the content was captured, a location where the content was captured or a list of people present when the content was received by the smart pen 100. This metadata simplifies location of data received on a specific date or data capture received when a certain person was present. For example, association of metadata with the content of a session would allow greater flexibility in searching sessions, for example to locate written data captured on a Thursday during a meeting attended by Frank. Using metadata allows the search to return accurate results even if the captured content did not include a date, but the metadata identified when the content was captured.

Alternatively, a user could selected a particular region of written notes and receive information about the session related to the selected region of written notes. For example, after selecting a location for written notes, a user receives information describing the session including the selected region of written notes and/or the location of other written notes included in that session.

Figure 4:
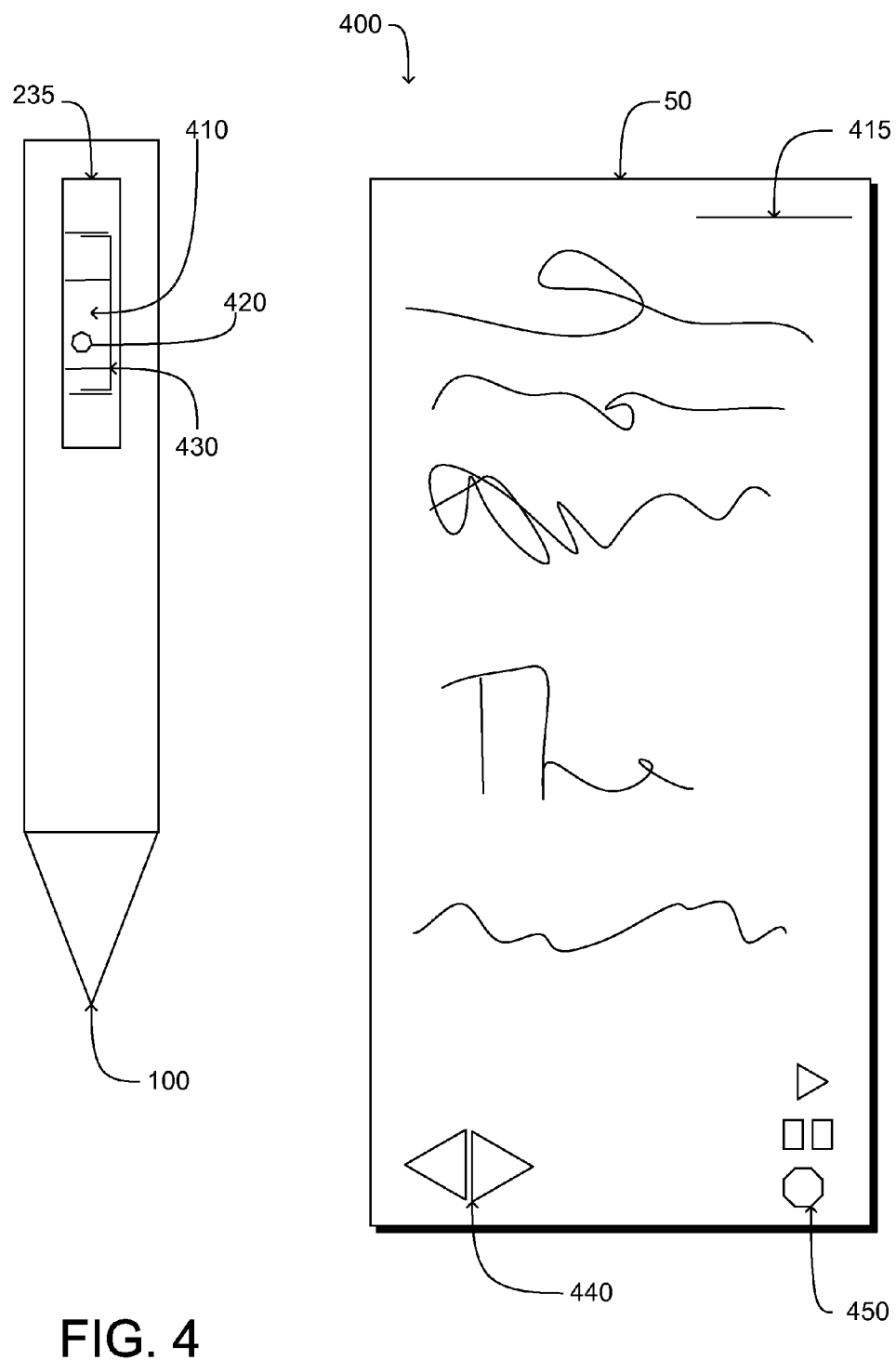
FIG. 4 is a diagram of a pen-based computing system for replaying a generated session in accordance with an embodiment of the invention.

Generated sessions including audio data can be replayed using the computing system 120 or the smart pen 100 using a variety of controls. FIG. 4 shows an example system 400 for replaying a session including audio data using a smart pen 100 and a writing surface 50, such as dot-enabled paper. The smart pen 100 includes a display 235, such as an organic light emitting diode (OLED) display which shows a fixed-length position bar 410 to a user. The fixed-length position bar 410 provides a visual indication of the current temporal location within the active session or within the session that is being played back. A first end of the fixed length position bar 410 represents the beginning of a session and a second end of the fixed-length position bar 410 represents the end of a session. The fixed-length position bar 410 displays the relative length of a session, allowing the fixed-length position bar 410 to represent a session that is a few seconds long or a session that is multiple hours.

The display 235 also presents an indicator 420 superimposed on the fixed-length position bar 410 to show the current playback position within the current session. In the example of FIG. 4, the indicator 420 comprises a small polygon or circle representing the current temporal position. In one embodiment, the indicator 420 is visually distinguished from the fixed-length position bar 410, such as by being a different color than the fixed-length position bar 410. The indicator 420 changes location along the fixed-length position bar 410 as the current temporal playback position changes. When audio is playing, the indicator 420 moves from the first end of the fixed-length position bar 410 to the second end of the fixed-length position bar 410. The rate at which the indicator 420 traverses the fixed-length position bar 410 depends on the total length of the session because the fixed-length position bar 410 uses the same length for different sessions (e.g., in shorter sessions the indicator 420 moves faster). If the current playback position is changed, such as by user input to move to a specific location in the session, the indicator 420 changes position along the fixed-length position bar 410 to represent the new playback position.

In an embodiment, the fixed-length position bar 410 also includes one or more bookmark markers 430, indicating the location of a bookmark, represented in FIG. 4 as lines perpendicular to the fixed-length position bar 410. These bookmarks can be created while the session is generated, added during playback or imported from another source. The bookmark markers 430 show the relative positions of bookmarks within the overall length of the current session.

Additionally, the writing surface 50 includes one or more control regions allowing user-control of session replay using the writing surface 50. In one embodiment, a printed representation of the fixed-length position bar 415 is included on, or affixed to, the writing surface 50, such as dot-enabled paper, at one or more locations. Similar to the fixed-length position bar 410 shown on the display 235, positions along the printed representation of the fixed-length position bar 415 represent relative temporal positions within the current session. Tapping a region on the printed representation of the fixed-length position bar 415 with the smart pen 100 begins playback of the session from the temporal position corresponding to the region that was tapped.

In one embodiment, the writing surface 50 also includes one or more navigation buttons 440. Accessing the navigation buttons 440 with the smart pen 100 causes the session playback to jump forward or to jump backward by a predefined amount of time. Additionally, accessing a navigation button 440 during recording playback can create a bookmark at the current recording time or playback position. Additionally, one or more sheets of the writing surface 50, such as dot-enabled paper, include control buttons 450 printed at, or affixed to, a location on the sheet. Accessing a control button 450 on any sheet of coded paper causes the smart pen 100 to take a predetermined action associated with the accessed control button 450. For example, accessing a record control button 450 on any sheet of the writing surface 50 causes the smart pen 100 to begin recording audio. Similarly, accessing a pause control button 450 on any sheet of the writing surface 50 causes the smart pen 100 to pause audio recording. The control buttons 450 offer several advantages, such as: allowing access to controls from anywhere during playback, allowing audio control even if the portion of the writing surface 50, such as a page of the dot-enabled paper, including the original notes is not present, allowing addition of notes to any sheet of the writing surface 50 rather than sheets of the writing surface 50 in sequence with the sheet of the writing surface 50 including the beginning of the notes and creation of multiple sessions from a single sheet of the writing surface 50 and navigation of the multiple sessions using the control buttons 450 included on the single sheet of the writing surface 50.

In an alternate embodiment, the printed representation of the fixed-length position bar 415 included on a sheet of the writing surface 50 is associated with the sheet of the writing surface 50 including the fixed-length position bar 415, navigation buttons 440 and control buttons 450. Hence, the length of the printed representation of the fixed-length position bar 415 corresponds to the total length of recorded audio associated with notes included on the sheet of the writing surface 50.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A smart pen device for generating one or more sessions including a plurality of different types of data comprising:
   a processor;
   a gesture capture system coupled to the processor for receiving gesture data of the smart pen, wherein the received gesture data represents marks made on a writing surface by the smart pen;
   one or more microphones coupled to the processor for receiving audio data;
   an onboard memory coupled to the processor and configured to store the received gesture data and received audio data responsive to the processor identifying the input; and
   a non-transitory computer-readable storage medium storing computer program code executable by the processor, the computer program code including instructions for:
      storing the received gesture data and received audio data to the onboard memory;
      generating a session identifier, which identifies a session of the smart pen;
      associating a portion of the received gesture data with a temporal position of the received audio data and with the session identifier; and
      generating an index file describing the session, the index file storing an association between (1) the session identifier, (2) the portion of the received gesture data, and (3) the temporal position within the received audio data associated with the portion of the received gesture data; and
   a storage device coupled to the processor for storing the index file.

2. The smart-pen device of claim 1, further comprising:
   a control mechanism coupled to the gesture capture system and the one or more microphones for receiving an input; and
   wherein the computer program code further includes instructions for:
      detecting that the control mechanism receives the input; and
      responsive to detecting that the control mechanism receives the input, removing the association between the temporal position of the received audio data and the received gesture data.

3. The smart-pen device of claim 1, wherein the computer program code executable by the processor further includes instructions for:
   applying one or more rules to the received gesture data to determine whether to associate the received gesture data with the temporal position of the received audio data corresponding to a time when the gesture capture system captured the gesture data.

4. The smart pen device of claim 3, wherein the one or more rules account for the timing, frequency or location of the received gesture data.

5. The smart pen device of claim 1, wherein the computer program code executable by the processor further includes instructions for:
   including metadata in the index file.

6. The smart pen device of claim 5, wherein the metadata is selected from a group consisting of a session name, an identification tag specifying a portion of the session and a comment associated with the session.

7. The smart pen device of claim 1, wherein the temporal position of the received audio data corresponds to a time when the gesture capture system captured the portion of the received gesture data.

8. A method for generating a session including a plurality of data types using a pen-based computing system, the method comprising:
   receiving audio data to a memory a smart pen;
   receiving gesture data of the smart pen, wherein the received gesture data represents marks made on a writing surface by the smart pen;
   storing the received gesture data and the received audio data;
   generating a session identifier, which identifies a session of the smart pen;
   associating a portion of the received gesture data with a temporal position of the received audio data and with the session identifier;
   generating an index file describing the session, the index file storing an association between (1) the session identifier, (2) the portion of the received gesture data, and (3) the temporal position within the received audio data associated with the portion of the received gesture data; and
   storing the index file in a storage device of the smart pen.

9. The method of claim 8, wherein the temporal position within the received audio data comprises:
   a temporal position corresponding to a time when the smart pen captured the portion of the received gesture data.

10. The method of claim 8, wherein associating the portion of the received gesture data with a temporal position within the received audio data comprises:
    applying one or more heuristic processes to the portion of the received gesture data and the received audio data using one or more parameters to identify a relationship between the portion of the received gesture data and the received audio data.

11. The method of claim 9, wherein the one or more parameters to identify the relationship are selected from a group consisting of timing of the captured gesture data, timing of the received audio data, location of the received gesture data, location of the received audio data, frequency of the received gesture data, frequency of the received audio data, characteristics associated with editing of the received gesture data, source of the received gesture data, source of the received audio data, location of the received gesture data within a page and identification of a speaker associated with the received audio data.

12. The method of claim 8, wherein associating the received gesture data with the temporal position within the received audio data comprises:
    responsive to receiving a user input, removing the association between the temporal position of the received audio data and the received gesture data.

13. The method of claim 8, wherein associating the portion of the received gesture data with the temporal position within the received audio data comprises:
    responsive to receiving a user input pausing receipt of the audio data, associating received gesture data received after the user input pausing receipt of the audio data with a time when the user input pausing receipt of the audio data was received.

14. The method of claim 8, further comprising:
    modifying the index file responsive to receiving a command to access the index file.

15. The method of claim 14 wherein modifying the index file responsive to receiving the command to access the index file comprises:

associating additional received gesture content with a temporal position within the received audio data identified by the command.

16. The method of claim 13, wherein modifying the index file responsive to receiving the command to access the index file comprises:

including additional audio data into the received audio data at a temporal position within the received audio data identified by the command.

17. A pen-based computing system for generating a session including a plurality of different types of data comprising:

a smart pen device configured to receive audio data and gesture data, wherein the gesture data represents marks made on a writing surface by the smart pen;

a non-transitory computer-readable storage medium storing computer program code executable by a processor coupled to the smart pen device, the computer program code including instructions for: storing the received gesture data and the received audio data, generating a session identifier, which identifies a session of the smart pen;

associating a portion of the received gesture data with a temporal position of the received audio data and with the session identifier; and generating an index file describing the session, the index file storing an association between (1) the session identifier, (2) the portion of the received gesture data, and (3) the temporal position within the received audio data associated with the portion of the received gesture data; and a storage device coupled to the processor and the smart pen for storing the index file.

18. The pen-based computing system of claim 17, further comprising:

an output module coupled to the processor and to the storage device, the output module presenting at least one of the audio data or the gesture data included in the index file.

19. The pen-based computing of claim 17, wherein the computer program code further includes instructions for:

receiving a search query; and searching the audio data and gesture data included in the index file for data matching the search query.

20. The pen-based computing system of claim 17, wherein associating the portion of the gesture data with the temporal position within the audio data comprises:

applying one or more heuristic processes to the gesture data and the audio data using one or more parameters to identify a relationship between the gesture data and the audio data.

21. The pen-based computing system of claim 20, wherein the one or more parameters to identify the relationship are selected from a group consisting of timing of the gesture data, timing of the audio data, location of the gesture data, location of the audio data, frequency of the gesture data, frequency of the audio data, characteristics associated with editing of the gesture data, source of the gesture data, source of the audio data, location of the gesture data within a page and identification of a speaker associated with the audio data.

* * * * *

UNITED STATES PATENT AND TRADEMARK OFFICE
CERTIFICATE OF CORRECTION

PATENT NO.       : 8,446,297 B2
APPLICATION NO.  : 12/415347
DATED            : May 21, 2013
INVENTOR(S)      : Jim Marggraff et al.

Page 1 of 1

It is certified that error appears in the above-identified patent and that said Letters Patent is hereby corrected as shown below:

In the Claims

Column 16, line 8, after "to a memory," insert -- by --.

Signed and Sealed this
Twenty-eighth Day of January, 2014

Michelle K. Lee
*Deputy Director of the United States Patent and Trademark Office*